May 7, 1968 J. P. HUFFMAN ET AL 3,382,377
POLARITY SHIFT RECEIVER
Filed Jan. 13, 1964
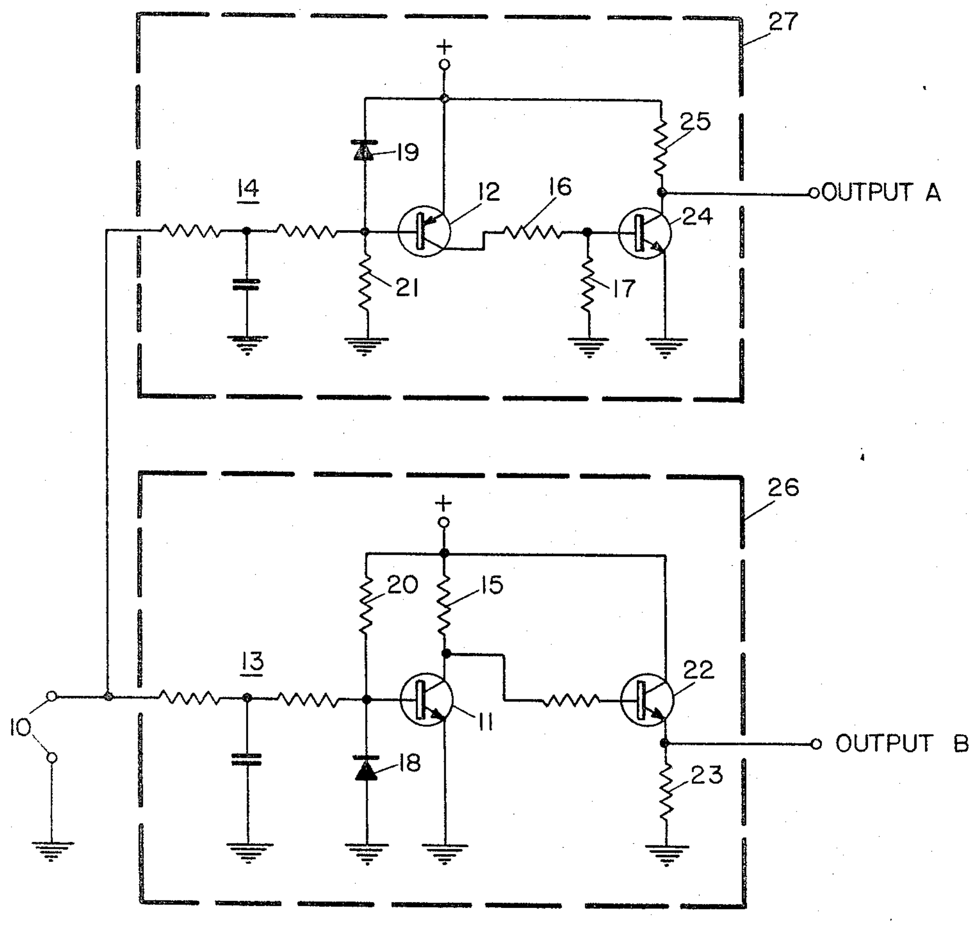
INVENTORS
J.P. HUFFMAN AND
J.H. AUER JR.
BY
THEIR ATTORNEY

United States Patent Office 3,382,377

Patented May 7, 1968

3,382,377

POLARITY SHIFT RECEIVER

Jerry P. Huffman, Rochester, and John H. Auer, Jr., Fairport, N.Y., assignors to General Signal Corporation, Rochester, N.Y., a corporation of New York Filed Jan. 13, 1964, Ser. No. 337,455

10 Claims. (Cl. 307—236)

ABSTRACT OF THE DISCLOSURE

Apparatus for providing electrical outputs which are indicative of the polarity of D.C. signals received over a wire line. The invention is comprised of two transistorized switching units, one unit providing an output when energy of positive polarity is received, the other providing an output when energy of negative polarity is received. Each unit is protected by a low pass filter, preventing damage by surge voltages such as may be caused by lightning.

This invention relates to means for distinguishing positive and negative received signals, and more particularly to means for providing output signals in accordance with the polarity of signals received over a line which is vulnerable to high voltage transients such as those produced by lightning.

It is often necessary to transmit data in the form of direct current pulses over long wire lines. In such instances, the well known forms of A.C. coupling, such as capacitive or transformer coupling, cannot be utilized. However, means must be provided for coupling electronic equipment to these lines so as to enable this equipment to operate in response to received data, without either attenuating the data pulses to a value insufficient to operate the equipment or supplying pulses of excessively high voltage which might destroy the receiving equipment. In addition, protection against high voltage transients, such as those caused by lightning, must also be provided in order to prevent damage to the receiving equipment. The instant invention provides means for coupling the received D.C. pulses to receiving equipment which meets these criteria.

One object of this invention is to provide means for producing output signals in accordance with the polarity of received input signals.

Another object is to provide means for terminating D.C. lines without substantially increasing line attenuation.

Another object is to provide means responsive to data transmitted in the form of bipolar D.C. pulses, which is protected against high voltage transients and noise.

The invention contemplates means for providing output voltages in accordance with the polarity of input voltages received over a line carrying bipolar direct current pulses comprising first and second filter means receiving the pulses from the line, first switching means providing output energy in response to received negative voltages, second switching means providing output energy in response to received positive voltages, and means coupling the outputs of the first and second filter means to the first and second switching means respectively.

The foregoing and other objects and advantages of the invention will become apparent from the following detailed description when read in conjunction with the accompanying drawing, in which the single figure is a schematic diagram of the polarity shift receiver.

In the figure, bipolar direct current pulses are received from a line at input terminals 10, and are coupled to the bases of a first transistor 11 and a second transistor 12 through a pair of T filters 13 and 14, respectively. Each of the T filters is a low-pass filter; that is, each filter comprises a relatively large input resistor, a relatively large output resistor connected to the input resistor, and a capacitor coupled to ground from the junction common to the input and output resistors. In order to provide adequate isolation of the circuit from the line, the input and output resistors are preferably on the order of 100K. Protection of the circuit against transient high voltages is thereby achieved. The emitter of transistor 11 is grounded, while collector bias is supplied to the transistor through a load resistor 15. Similarly, positive emitter bias is supplied to the emitter of transistor 12, while collector bias is supplied through a pair of series-connected resistors 16 and 17. A pair of diodes 18 and 19 are coupled between the base and emitter of transistors 11 and 12, respectively, for the purpose of limiting the reverse base-to-emitter voltage on each of the respective transistors. It will be noted that transistor 11 is of the NPN type, while transistor 12 is of the PNP type; hence, transistor 11 is rendered conductive in response to positive base-to-emitter voltages, while transistor 12 is rendered conductive in response to negative base-to-emitter voltages. Thus, diode 18 conducts when base-to-emitter voltage on transistor 11 is negative, while diode 19 conducts when base-to-emitter voltage on transistor 12 is positive. Positive base bias is supplied to transistor 11 through a biasing resistor 20. Similarly, when the base of transistor 12 receives no input signal, it is biased negatively through a resistor 21.

Input voltages are resistively coupled from the collector of transistor 11 to the base of a transistor 22, which is connected in an emitter-follower configuration to supply output voltages from the emitter across a load resistor 23, while positive bias is supplied to the collector. Since transistor 22 is an NPN type, conduction occurs when the base is driven positive with respect to the emitter. Output voltage supplied by transistor 22 is designated output B.

The base of an NPN transistor 24 is coupled to the junction common to resistors 16 and 17. Positive collector bias is supplied to the transistor through a collector load resistor 25, while the emitter is grounded. Output voltages are supplied from the collector of transistor 24 and are designated output A.

In operation, assume first that no line pulses are received. Under these conditions, positive base-to-emitter bias exists on transistor 11, while negative base-to-emitter bias exists on transistor 12. Hence, transistors 11 and 12 are each in a conductive state, resulting in substantially zero base voltage on transistor 22 and a highly positive base bias on transistor 24. Transistor 22 is therefore non-conductive, and substantially no voltage drop appears across resistor 23. Hence, substantially no voltage is produced at output B. Similarly, transistor 24 is in a conductive condition, so that a larger voltage drop exists across resistor 25. Hence, the collector of transistor 24 is at substantially zero voltage, and substantially no voltage therefore exists at output A.

Assume now that a positive line pulse is received at input terminals 10. Because of the presence of the T filters, this pulse must exist for a predetermined minimum length of time, in order to affect the circuit. This feature renders the circuit relatively insensitive to extraneous noise voltages. Since the base of transistor 11 is biased positive, no change exists at output B. Hence, substantially zero voltage is provided at output B. However, a voltage drop appears across resistor 21 which drives the base of transistors 12 and 24 may be referred to as a positive line off transistor 12, thereby dropping the base voltage on transistor 24 to substantially zero. Hence, transistor 24 is driven out of conduction, and substantially no voltage drop now exists across resistor 25, so that a positive output voltage is produced at output A. When the positive pulse at input terminals 10 is completed, base bias resistor 21 again biases transistor 12 into conduction. Under these conditions, the voltage at output A disappears.

Assume next that a negative input voltage is supplied at terminals 10. Again, because of the presence of the T filters, this pulse must also exist for the predetermined minimum length of time, in order to affect the circuit. This voltage has no effect on transistor 12, since the base-to-emitter bias on the transistor is already negative; therefore, substantially no voltage appears at output A. However, the negative pulse drives the base-to-emitter voltage on transistor 11 negative, causing the transistor 11 to cut off. Substantially no voltage drop then appears across resistor 15, and the base of transistor 22 accordingly is driven positive. Hence, transistor 22 becomes conductive, and a large voltage drop appears across resistor 23 which provides a voltage at output B. When the negative input pulse is completed, base-to-emitter bias of transistor 11 again becomes positive, and a voltage drop again appears across resistor 15 which drives the base voltage on transistor 22 to substantially zero. Hence, transistor 22 again becomes non-conductive and the voltage drop across resistor 23 becomes substantially zero, so that substantially zero voltage then appears at output B.

It can now be seen that a voltage is provided at output B in response to negative input voltages, while a voltage is produced at output A in response to positive input voltages. Hence, the circuitry 26 associated with transistors 11 and 22 may be referred to as a negative line terminating unit, while the circuitry 27 associated with transistors 12 and 24 may be referred to as a positive line terminating unit. Either of these line terminating units may be used separately to detect presence of proper unipolar line pulses if so desired. Moreover, it should be noted that line terminating units 26 and 27 are well-protected from high voltage transients such as those produced by lightning, as well as from noise, because of the presence of T filters 13 and 14, respectively.

Thus, there has been shown a polarity shift receiver for detecting presence of bipolar pulses. The circuit comprises a pair of opposite unipolar pulse responsive line terminating units connected in parallel. The circuit is well-protected against undesired transients, and may be used for direct current line termination without substantially increasing line attenuation.

Although but one embodiment of the present invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention.

What is claimed is:

1. A polarity shift receiver for providing output energy in accordance with the polarity of input pulses received over a single wire line, relative to a reference potentials, comprising first and second filter means receiving pulses from the line, first switching means providing output energy in response to received negative voltages, second switching means providing output energy in response to received positive voltages, and means coupling the outputs of the first and second filter means to the first and second switching means respectively.

2. The polarity shift receiver of claim 1 wherein said first and second filter means each comprises input and output resistances coupled in series with the wire line, and a capacitor coupling the junction common to the input and output resistances to a terminal at the reference potential.

3. A polarity shift receiver for providing output energy in accordance with the polarity of input pulses received over a wire line, comprising first and second T filters receiving pulses from the line, an NPN transistor having input and output electrodes, a PNP transistor having input and output electrodes, means coupling output signals from the first T filter to the input electrode of the PNP transistor, means coupling output signals from the second T filter to the input electrode of the NPN transistor, first and second amplifier means, means coupling the output electrode of the PNP transistor to the input of the first amplifier means, means coupling the output electrode of the NPN transistor to the input of the second amplifier means, and means supplying output signals from the first and second amplifier means.

4. A polarity shift receiver for providing output energy in accordance with the polarity of input pulses received over a wire line, comprising first and second DC line terminating networks, each said network including T filter receiving pulses from the line, a first transistor having input and output electrodes, means coupling output signals from the T filter to the input electrode, amplifier means, means coupling the output electrode to the input of the amplifier means, and means coupling output signals from the amplifier means thereby providing output signals for the terminating network.

5. A polarity shift receiver for providing output energy in accordance with the polarity of input pulses received over a single wire line, relative to a reference potential, comprising first and second filter means receiving pulses from the line, a first PNP transistor having input and output electrodes, first, second and third NPN transistors, each said NPN transistor having input and output electrodes, means coupling output pulses from the first filter means to the input electrode of the PNP transistor, means coupling output pulses from the second filter means to the input electrode of the first NPN transistor, first resistor means coupling the output electrode of the PNP transistor to the input electrode of the second NPN transistor, second resistor means coupling the output of the first NPN transistor to the input electrode of the third NPN transistor, and first and second load resistors coupled to the output electrodes of the second and third NPN transistors respectively.

6. The polarity shift receiver of claim 5 wherein said first and second filter means each comprises input and output resistances coupled in series with the wire line, and a capacitor coupling the junction common to the input and output resistances to a terminal at the reference potential.

7. A polarity shift receiver for providing output energy in accordance with the polarity of input pulses received over a single wire line, relative to a reference potential comprising first and second filter means receiving pulses from the line, first, second, third and fourth transistors, each said transistor having a base, a collector and an emitter, means coupling output energy from the first filter means to the base of the first transistor, means coupling output energy from the second filter means to the base of the second transistor, means coupling the collector of the first transistor to the base of the third transistor, means coupling the collector of the second transistor to the base of the fourth transistor, means coupling biasing voltage to the emitter of the first transistor and the collector of the fourth transistor, means coupling the emitters of the second and third transistors to ground, means coupling a first load resistor to the collector of the third transistor, and means coupling a second load resistor to the emitter of the fourth transistor.

8. The polarity shift receiver of claim 7 wherein said first and second filter means each comprises input and output resistances coupled in series with the wire line, and a capacitor coupling the junction common to the input and output resistances to a terminal at the reference potential.

9. The polarity shift receiver of claim 8 wherein the first transistor comprises a PNP transistor and the second, third and fourth transistors each comprises an NPN transistor.

10. The polarity shift receiver of claim 9 including first and second diodes, each said diode including an anode and a cathode, means coupling the anode of the first diode to the base of the first transistor, means coupling the cathode of the first diode to the emitter of the first transistor, means coupling the cathode of the second diode to the base of the second transistor and means coupling the anode of the second diode to the emitter of the second transistor.

References Cited

UNITED STATES PATENTS

| | | | |
|---|---|---|---|
| 3,032,704 | 5/1962 | Beck | 330—29 XR |
| 3,041,475 | 6/1962 | Fisher | 307—88.5 |
| 3,182,202 | 5/1965 | Hesketh | 333—7 XR |
| 3,284,614 | 11/1966 | Bramer | 307—88.5 |

ARTHUR GAUSS, *Primary Examiner.*

J. ZAZWORSKY, *Assistant Examiner.*